Jan. 14, 1964

S. DUINKER ETAL

METHOD OF MANUFACTURING A MAGNETIC HEAD HAVING A GLASS SPACER

Filed June 15, 1959

3,117,367

INVENTOR

SIMON DUINKER
JULES BOS

BY

Frank R. Jifani

AGENT

United States Patent Office 3,117,367

Patented Jan. 14, 1964

3,117,367

METHOD OF MANUFACTURING A MAGNETIC HEAD HAVING A GLASS SPACER

Simon Duinker and Jules Bos, Eindhoven, Netherlands, assignors to North American Philips Company, Inc., New York, N.Y., a corporation of Delaware Filed June 15, 1959, Ser. No. 820,424
Claims priority, application Netherlands July 3, 1958
5 Claims. (Cl. 29—155.5)

Figure 1:
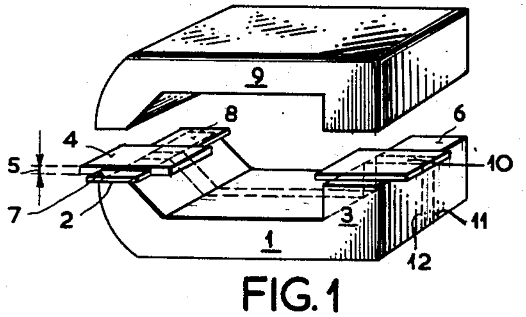

The invention relates to a method of manufacturing recording and/or reproducing heads; usually, these heads comprise at least two circuit portions of sintered, oxidic, ferromagnetic material, spaced apart by a useful gap filled with glass. The glass serves as non-magnetic material to protect the useful gap and also acts to connect the two circuit portions mechanically with each other. The process of manufacture starts with two portions each provided with at least one precisely machined surface, these portions being joined with the machined surfaces facing each other with an intermediate glass sheet, the thickness of the sheet being a few percent larger than the finally desired gap length. This assembly is then heated to the softening range of the glass, the portions being then pressed toward each other at a temperature lying in the said softening range and with such a pressure that, subsequent to the hardening of the glass, the correct gap length is reached. The gap height is determined, subsequent to cooling of the assembly, by accurately shaping (for example polishing) the guide surface formed by the two circuit portions on the top side of the head.

The invention furthermore relates to magnetic recording and/or reproducing heads manufactured by this method.

This known method is particularly intended for the manufacture of heads of high resolving power, in which the gap has a length of only a few microns. In this case the thickness of the glass sheet between the accurately machined surfaces is so small that, during the heating at a temperature in the softening range of the glass and the simultaneous compression, the viscosity forces in the softened glass are capable of keeping this glass in place between the said surfaces and of preventing the glass from being pressed away out of the gap between the said surfaces by the high pressure exerted.

It appears, however, that this is not the case with heads in which the gap length is of the order of 10 microns or more.

It will be obvious that under the conditions set forth the adjustment of the gap length to the correct value is not possible when the glass flows away.

Efforts have been made to prevent the glass from flowing away by providing, at the ends of the gap, metallic foils or wires, the thickness of which corresponds to the desired gap length and the melting point of which exceeds the temperature of the heated circuit portions and the intermediate glass. It is found, however, that at the said temperature (about 900° C.) these metal foils or wires react either with the glass or with the ferrite or with both; this, of course, affects adversely the magnetic and mechanical properties of the heads and renders useless the adjustment of the gap length to the correct value.

If the material of these foils or wires would not be substantially deformed during the said reactions, a head could be manufactured, which fulfills the purity requirements of the material; this could be done by starting from circuit portions of sufficient width and by removing material in the surroundings of the gap ends, but since the said reactions have their effect to a comparatively large depth in the gap and in the surrounding material, this method would give rise to considerable loss of material.

In addition, apart from the requirement that the material of the foils or wires should not melt at the said temperatures and that this material should not react with the glass, the ferrite or with both, this material must be readily adjustable to the required thickness (10 microns or more); it must also maintain its mechanical rigidity at the said temperatures, in order that it does not break down under the high pressures required in the pressing process. Most metallic materials do not fulfill the latter requirement, so that also for this reason the last-mentioned method gives rise to difficulties in adjusting the gap length to the correct value.

The invention has for its object to mitigate these disadvantages; the method according to the invention is characterized in that, prior to heating, mica spacers are provided in addition between the said surfaces of the portions, the thickness of these spacers being substantially equal to the finally desired gap length.

The invention will now be described more fully with reference to the figures of the drawing.

Referring to FIG. 1, reference numeral 1 designates a circuit portion of sintered oxidic, ferromagnetic material, the surface 2 of which operates as a gap surface and the part 3 of which forms part of the closing yoke of the completed product. On the surface 2 is arranged a glass sheet 4, of which the dimension 5 exceeds by some percent, if necessary even a few tens of percent the finally desired gap length, which is of the order of 10 microns or more. On the surface 6 of the part 3 is also arranged a glass sheet 10, which, however, may be materially thinner than the sheet 4.

It should be noted that it is advisable to use glass which has an expansion coefficient, at the temperature at which the magnet head is used, which is substantially equal to the expansion coefficient of the ferromagnetic material and differs, for example, not more than 5% therefrom; preferably, however, glass is used having an expansion coefficient in the whole temperature range between the temperature at which the magnet head is used and the temperature at which the glass softens, which is substantially equal to the expansion coefficient of the ferromagnetic material and differs, for example, not more than 10% therefrom.

Reference numerals 7 and 8 designate the mica spacers, of which the thickness is, as far as possible, equal to the desired gap length.

On the assembly thus formed is arranged a second circuit portion 9, which may be identical to the first circuit portion; it may, however, also be a non-profiled piece of sintered, oxidic, ferromagnetic material. This second circuit portion is shown in the figure in a position, in which it is not yet arranged on the first circuit portion provided with glass and mica.

The assembly thus obtained is heated at a temperature in the softening range of the employed glass and the two circuit portions are compressed. Owing to the mica spacers no glass can be pressed out of the gap during the pressing process, after the desired gap length has been definitely attained.

It should be noted that, when the desired gap length is attained, the distance between the surface 6 of the closing piece 3 and the corresponding surface of the second circuit portion must be sufficient to hold the compressed glass sheet 10, which serves only as a mechanical connection between the two circuit portions 1 and 9 and which, as such, may be replaced by other means.

After cooling, those parts of the gap which are filled with mica can be ground away or sawed off and the guide surface of the head can be machined at the same time.

If desired, the structure may be sawed along one or more planes at right angles to the direction of the gap width, for example, along the planes 11 and 12.

Thus a plurality of circuits can be obtained from one structure manufactured in accordance with the invention.

Figure 2:
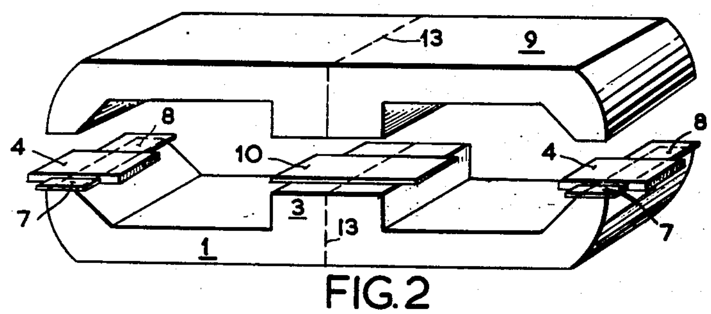

It will be obvious that the circuit portions may be arranged in a twin structure, as shown in FIG. 2. After carrying out the same process as described above, the assembly must be sawed along a plane 13, so that two structures as described with reference to FIG. 1 become available.

Figure 3:
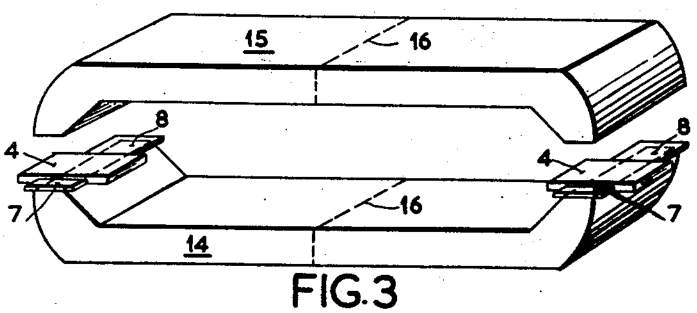

Similarly the process may start from two portions 14 and 15, shown in FIG. 3. After carrying out the process described with reference to FIG. 1, the assembly must be sawed along a plane 16, so that two circuit portions are available, each of which may be completed with a closing yoke.

Also the structures shown in FIGS. 2 and 3 may be sawed along one or more planes at right angles to the direction of the gap width as described with reference to planes 11 and 12 of FIG. 1.

While the invention has been described with reference to specific embodiments, various other modifications thereof will be readily apparent to those skilled in the art without departing from the inventive concept, the scope of which is set forth in the appended claims.

What is claimed is:

1. A method of manufacturing magnetic heads consisting of at least two circuit parts of sintered oxidic ferromagnetic material with a gap therebetween filled with glass serving as a protection and a mechanical connection means, comprising: accurately machining at least one surface of each of said two circuit parts, arranging said parts one upon the other with the machined surfaces facing each other, placing a glass sheet having side portions and top and bottom portions between the parts with the top and bottom portions contacting said surfaces, the thickness of the glass sheet being greater than the finally desired gap length, placing mica spacers between said surfaces adjacent to and abutting only the side portions of said glass sheet, said mica having a higher melting temperature than said glass, said mica spacers having a thickness substantially equal to the finally desired gap length, heating the assembly thus obtained to a temperature in the melting range of the glass, pressing the parts against each other at said temperature, cooling the assembly, and grinding away the portions of the circuit parts including the mica when the assembly has been cooled.

2. A method of manufacturing magnetic heads consisting of at least two circuit parts of sintered oxidic ferromagnetic material with a gap therebetween filled with glass serving as a protection and a mechanical connection means, comprising: accurately machining two surfaces of each of said two circuit parts, arranging said parts one upon the other with corresponding machined surfaces of opposing parts facing each other, placing a glass sheet between each pair of facing machined surfaces, the thickness of the glass sheets being greater than the finally desired gap length, each glass sheet having side portions and top and bottom portions with the top and bottom portions contacting the facing surfaces, placing mica spacers between one pair of said surfaces adjacent to and abutting only the side portions of the glass sheet therebetween, said mica having a higher melting temperature than said glass, said mica spacers having a thickness substantially equal to the finally desired gap length, heating the assembly thus obtained to a temperature in the melting range of the glass, pressing the parts against each other at said temperature, cooling the assembly, and grinding away the portions of the circuit parts including the mica when the assembly has been cooled.

3. A method of manufacturing magnetic heads consisting of at least two circuit parts of sintered oxidic ferromagnetic material with a gap therebetween filled with glass serving as a protection and a mechanical connection means, comprising: accurately machining three surfaces of each of said two circuit parts, arranging said parts one upon the other with corresponding machined surfaces of opposing parts facing each other, placing a glass sheet between each pair of facing machined surfaces, the thickness of the glass sheets being greater than the finally desired gap length, each glass sheet having side portions and top and bottom portions with the top and bottom portions contacting the facing surfaces, placing mica spacers between the two outer pairs of surfaces adjacent to and abutting only the side portions of the glass foil therebetween, said mica having a higher melting temperature than said glass, the thickness of said spacers being substantially equal to the finally desired gap length, heating the assembly thus obtained to a temperature in the melting range of the glass, pressing the parts against each other at said temperature, cooling the assembly, grinding away the portions of the circuit parts including the mica when the assembly has been cooled, and separating the assembly into two portions, each portion comprising a set of surfaces with an intermediate glass sheet and spacers and a set of surfaces with an intermediate glass sheet.

4. A method of manufacturing magnetic heads consisting of at least two circuit parts of sintered oxidic ferromagnetic material with a gap therebetween filled with glass serving as a protection and a mechanical connection means, comprising: accurately machining two surfaces of each of said two circuit parts, arranging said parts one upon the other with corresponding machined surfaces of opposing parts facing each other, placing a glass sheet between each pair of facing machined surfaces, the thickness of the glass sheets being greater than the finally desired gap length, each glass sheet having side portions and top and bottom portions with the top and bottom portions contacting the facing surfaces, placing mica spacers between opposing sets of surfaces adjacent to and abutting only the side portions of said glass foil, said mica having a higher melting temperature than said glass, the thickness of said spacers being substantially equal to the finally desired gap length, heating the assembly thus obtained to a temperature in the melting range of the glass, pressing the parts against each other at said temperature, cooling the assembly, separating the assembly into two portions each of which comprises a set of two surfaces, and grinding away the portions of the circuit parts including the mica.

5. A method of manufacturing magnetic heads consisting of at least two circuit parts of sintered oxidic ferromagnetic material with a gap therebetween filled with glass serving as a protection and a mechanical connection means, comprising: accurately machining at least one surface of each of said two circuit parts, arranging said parts one upon the other with the machined surfaces facing each other, placing a glass sheet having side portions and top and bottom portions between the parts with the top and bottom portions contacting said surfaces, the thickness of the glass sheet being greater than the finally desired gap length, placing mica spacers between said surfaces adjacent to and abutting only the side portions of said glass sheet, said spacers having a thickness substantially equal to the finally desired gap length, heating the assembly thus obtained to a temperature in the melting range of the glass, pressing the parts against each other at said temperature, cooling the assembly, and grinding away the portions of the circuit parts including the mica when the assembly has been cooled.

References Cited in the file of this patent

UNITED STATES PATENTS 732,812 Anderson ---------------- July 7, 1903
2,297,492 Michaelis --------------- Sept. 29, 1942

2,415,412 Buchwald et al. ---------- Feb. 11, 1947
2,496,441 Camras ------------------ Feb. 7, 1950
2,526,703 Smith ------------------- Oct. 24, 1950
2,526,704 Blair -------------------- Oct. 24, 1950
2,553,749 Clark et al. -------------- May 22, 1951
2,825,184 Charlotte ---------------- Mar. 4, 1958
2,866,013 Reis --------------------- Dec. 23, 1958
2,882,648 Hovgaard et al. ---------- Apr. 21, 1959
2,907,834 Duinker et al. ------------ Oct. 6, 1959